United States Patent
Davis (10) Patent No.: US 8,212,601 B2
(45) Date of Patent: Jul. 3, 2012

(54) METHOD AND APPARATUS FOR PROVIDING SYSTEM CLOCK FAILOVER

(75) Inventor: Eric Roger Davis, Sunnyvale, CA (US)

(73) Assignee: Netgear, Inc., San Jose, CA (US)

( * ) Notice: Subject to any disclaimer, the term of this patent is extended or adjusted under 35 U.S.C. 154(b) by 116 days.

(21) Appl. No.: 12/915,464

(22) Filed: Oct. 29, 2010

(65) Prior Publication Data

US 2012/0105112 A1 May 3, 2012

(51) Int. Cl.
*H03K 5/22* (2006.01)

(52) U.S. Cl. ............... 327/291; 327/20; 327/50; 327/99; 327/298

(58) Field of Classification Search .................... 327/20, 327/40–43, 50, 99, 291, 293, 298
See application file for complete search history.

(56) References Cited

U.S. PATENT DOCUMENTS

| | | | | |
|---|---|---|---|---|
| 5,969,558 | A * | 10/1999 | Abe | 327/292 |
| 6,407,591 | B1 * | 6/2002 | Wong et al. | 327/63 |
| 6,794,919 | B1 * | 9/2004 | Volk et al. | 327/291 |
| 7,936,200 | B2 * | 5/2011 | Abouda et al. | 327/298 |

* cited by examiner

*Primary Examiner* — An Luu (74) *Attorney, Agent, or Firm* — J W Law Group; James M. Wu (57) ABSTRACT

A method and apparatus for providing system clock failover using a one-shot circuit are disclosed. A process, in one embodiment, is able to detect a clock failure using a one-shot circuit, wherein the clock signals are generated by a first clock circuit. Upon generating a switching signal in response to the clock failure, a system reset signal is asserted for a predefined time period in accordance with the clock failure. After switching a second clock circuit to replace the first clock circuit, the process is capable of resuming the clock signals via the second clock circuit.

20 Claims, 6 Drawing Sheets

METHOD AND APPARATUS FOR PROVIDING SYSTEM CLOCK FAILOVER

FIELD

The technical field of embodiments of the present invention relates to a system clock for digital processing system. More specifically, embodiments of the present invention relate to a system clock management.

BACKGROUND

In order for a typical digital processing system to function, a synchronous mechanism such as clock(s) and/or oscillator(s) is used to coordinate data processing by various digital devices and/or components such as read and write operations. Modern digital devices, such as processors, routers, wireless computing systems, or communication controllers, typically include one or more clocks to synchronize and facilitate data processing. A clock, which is also known as oscillator or crystal, oscillates or vibrates at a specific frequency, normally measured in megahertz (millions of cycles per second) ("MHz").

A clock "tick," also known as a clock cycle, is typically considered as the smallest unit of time in which data processing such as a read operation takes place. The clock cycle is what, for example, drives various components or circuits within a digital system to perform some functional tasks. The faster the clock ticks, the more performance can typically be rendered by a computing machine or system.

A problem associated with a digital processing device or system is that a system will go down when its system clock fails. When a system clock stops ticking, a processor or central processing unit ("CPU") within a computing system fails or crashes as soon as the clock ceases to oscillate (or tick). When the processor stops working, the system shuts down. If the system is down due to clock failure, the diagnostic unit will not be able to interrogate reasons of failure because the diagnosis unit requires a functioning clock to perform various diagnostic tasks. As such, a digital processing system typically requires a major repair such as replacing motherboard when its clock system stops working.

A conventional approach to mitigate impact of clock failure is to employ a sophisticated Application-Specific Integrated Circuit ("ASIC") clock recovery component for clock backup. A drawback associated with the conventional approach is its complicated design and high cost for the additional ASIC component.

An alternative approach to resolve system clock failure is to use a clock signal distribution scheme with a master clock feeding to multiple slave clocks. The drawback associated with this approach is that when the master clock fails, the slave clocks stop working as well.

SUMMARY

Embodiments of the present invention disclose a process or a device capable of providing system clock failover using a one-shot circuit. The process, in one embodiment, is able to detect a clock failure using a one-shot circuit, wherein the clock signals are generated by a first clock circuit. Upon generating a switching signal in response to the clock failure, a system reset signal is delayed for a predefined time period in accordance with the clock failure. After switching a second clock circuit to replace the first clock circuit, the process is capable of resuming the clock signals via the second clock circuit.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, system and apparatus of implementing system clock failover using a clock monitoring component and a system reset circuit to resume system clock.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

In accordance with the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof.

The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Embodiments of the present invention disclose a process or a device capable of providing system clock failover using various simple components such as a one-shot circuit. The process, for example, employs a one-shot circuit to monitor and/or detect a clock failure where clock signals are generated by a primary clock circuit. Upon generating a switching signal in response to detecting the clock failure, a system reset signal is activated with a delay in accordance with the clock failure. Depending on the applications, sufficient delay is required to reduce glitches or spikes during a switchover from a primary clock circuit to a secondary clock circuit. After replacing the primary clock circuit with the secondary clock circuit, the process resumes system clock signals using the secondary clock circuit.

Figure 1:
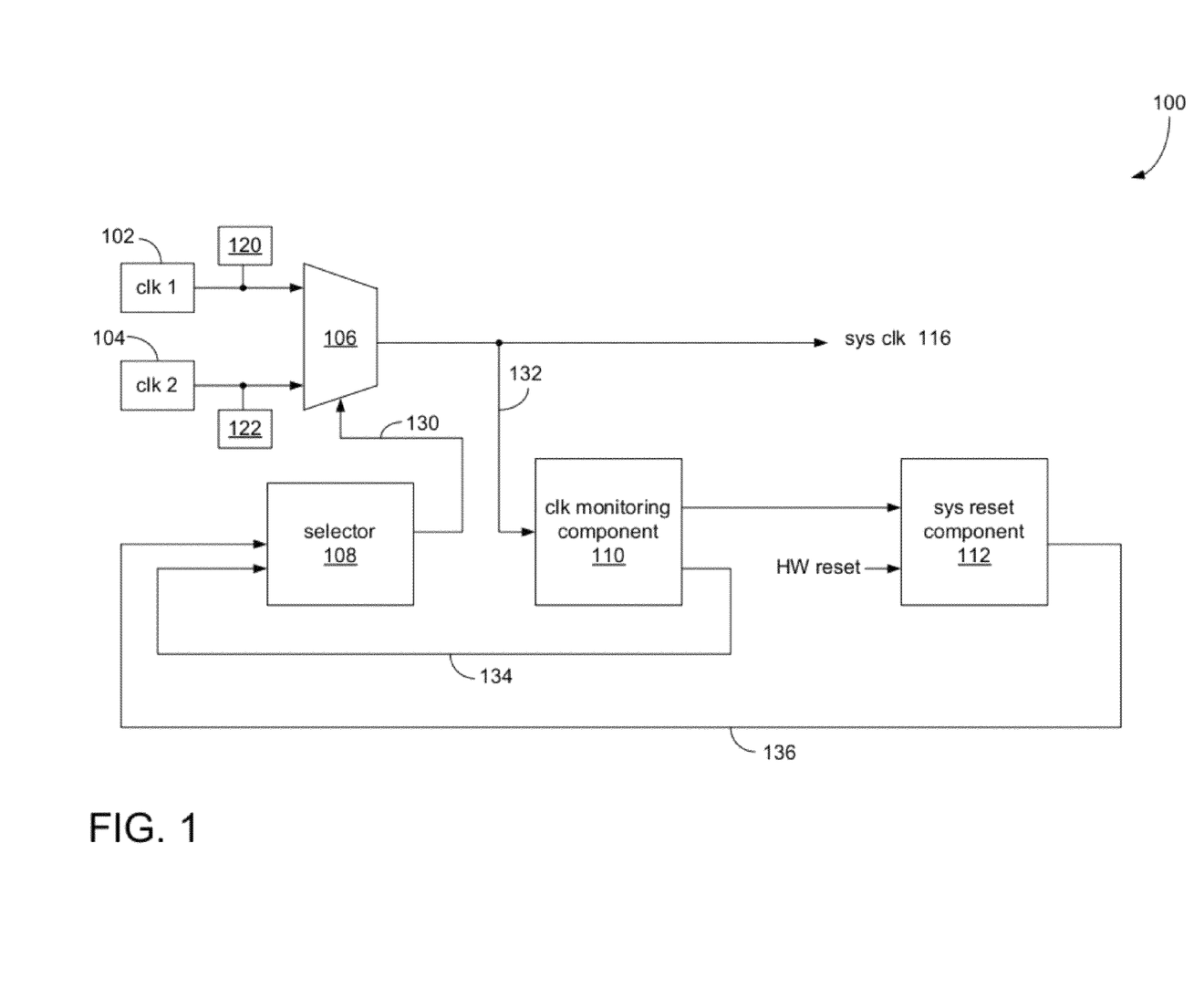
FIG. 1 is a block diagram illustrating a process of system clock failover using a clock monitoring component and a system reset circuit in accordance with one embodiment of the present invention.

FIG. 1 is a block diagram 100 illustrating a process of system clock failover using a clock monitoring component and a system reset circuit in accordance with one embodiment of the present invention. Diagram 100 includes a first clock source 102, a second clock source 104, a multiplexer 106, a selector 108, a clock monitoring component 110, and a system reset component 112. First clock source 102 can also be referred to as primary clock circuit, primary clock, or primary clock source. Second clock source 104 can also be referred to as secondary clock circuit, secondary clock, up-back clock, or secondary clock source. Clock sources 102-104 are also coupled to clock status bits 120-122 wherein clock status bits 120-122 indicate clock status. It should be noted that the underlying concept of the exemplary embodiment(s) of the present invention would not change if one or more blocks (or components) were added to or removed from diagram 100.

The process of system clock failover, in one embodiment, is able to switch between a primary clock source 102 and a secondary clock source 104 in accordance with a select signal via a connection 130. The select signal is generated by selector 108. The term "clock source" can be referred to as "clock," "clock circuit," "crystal," "oscillator," et cetera and they can be used interchangeably. For example, clock sources can be crystals capable of oscillating in a range between 20 MH and 500 MHz depending on applications. System clock 116, in one embodiment, is generated in accordance with either primary clock source 102 or secondary clock source 104 based on logic state of the select signal. For example, when select signal is set to logic state zero (0), primary clock source 102 is selected. As long as the select signal maintains at a logic state, the selection of clock source does not change.

Multiplexer 106, also known as a gate circuit, is configured to gate or select either primary clock 102 or secondary clock 104 as system clock 116. For example, multiplexer 106 can be a two-to-one (2-1) selector (or mux) able to multiplex or select one of the two clock signals as a system clock based on the logic state of select signal. The selected clock signal is subsequently forwarded to various circuits and/or components such as CPUs and processing engines for digital processing and/or operations.

Clock monitoring component 110, in one embodiment, is configured to monitor system clock 116 or system clock signals generated by system clock 116. A clock failover signal indicating failure of system clock 116 is broadcasted by clock monitoring component 110 over a connection 134 upon detecting a system clock failure. To detect clock failure, clock monitoring component 110 receives system clock 116 via a connection 132 and constantly monitoring clock cycles or ticks generated by system clock 116. Clock monitoring component 110 instructs selector 108 via connection 134 to maintain the selection of source clock as long as normal clock cycles generated by system clock 116 are detected. If clock cycles provided by system clock 116 are absent or failed, clock monitoring component 110 subsequently instructs selector 108 to switch source clock such as switching from primary clock source 102 to secondary clock source 104. In one embodiment, clock monitoring component 110 includes a one-shot circuit which is capable of detecting a system clock failure and/or triggering the clock failover signal.

A function of a one-shot circuit, also known as a monostable multivibrator, is to generate an output pulse having a predefined duration or pulse triggered by an event during a digital processing operation. A one-shot circuit such as SN74121 is a retriggerable one-shot circuit capable of keeping its signal at a constant logic level such as logic state high if system clock 116 works properly. If the output of one-shot circuit maintains at an active level, selector 108 keeps the clock source selection whereby no clock source switching happens. If, however, system clock 116 fails and it stops retriggering the one-shot circuit, the one-shot circuit changes its logical output state which indicates to the selector 108 to switch from a previously selected clock source to a backup clock source. When the one-shot circuit fires a clock failover signal to selector 108, selector 108 issues a select signal to multiplexer 106 to indicate a switch from, for example, primary clock source 102 to secondary clock 104.

An asynchronous switchover from a primary clock source to a secondary clock source can cause components and/or system to fail or crash due to glitches during the clock switchover. Depending on applications, clock glitch or glitches can potentially stall or halt a system's normal operation. To recover from this potential condition, a system reset component 112 is used to restart the system giving the secondary clock source or backup clock source time to become stable. In one embodiment, system reset component 112 holds a system reset signal for a predefined delay. Depending on the applications, the delay can be set to a range from 50 to 500 milliseconds ("ms"). When the system reset signal over a connection 136 becomes inactive after proper delay, the secondary clock should be sufficiently stable whereby it is subsequently used as system clock 116. When system recovers after resumption of system clock, the processor or diagnostic unit within the system begins to evaluate (or interrogate) reasons for clock failure.

Referring back to FIG. 1, diagram 100, in one aspect, discloses a system clock failover, wherein a function of system clock failover is to change clock signal from one clock source to another clock source without significantly affecting clock domains or system performance. In one embodiment, when a primary clock fails, failover occurs during which a secondary, spare, or backup clock source assumes clock distributions and tasks formerly handled by the primary clock. During normal operation, a secondary or spare clock source functions as a standby status which means that the secondary clock is running in parallel with the primary clock, and the secondary clock source is able to quickly take over tasks previously handled by the primary clock source if the primary clock source fails.

An advantage of employing embodiment(s) of system clock failover is to provide a clock recovery or clock resumption with simple and inexpensive electronic components. Upon detecting of system clock failure, a backup or secondary clock automatically takes over and becomes a new system clock, and the system can subsequently run a diagnostic procedure to identify reasons of previous clock failure.

Figure 2:
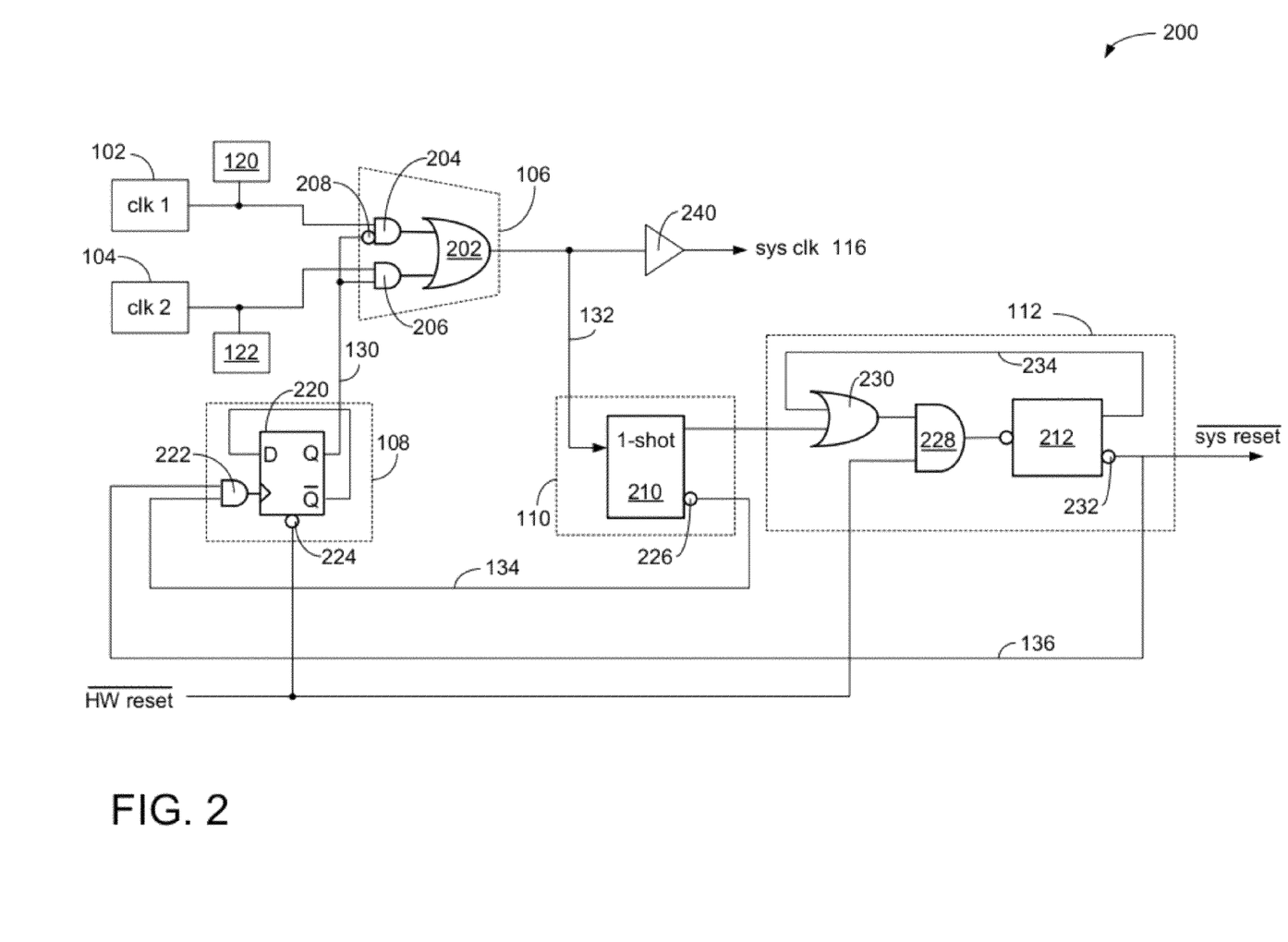
FIG. 2 is a block diagram illustrating an implementation of clock failover using a one-shot circuit in accordance with one embodiment of the present invention.

FIG. 2 is a block diagram illustrating an implementation of clock failover using a one-shot circuit in accordance with one embodiment of the present invention. Similar to diagram 100, diagram 200 also includes first clock source 102, second clock source 104, multiplexer 106, selector 108, clock monitoring component 110, and system reset component 112. Clock sources 102-104 are also coupled to clock status bits 120-122 which store information relating to clock source status. In one aspect, the system monitors clock status stored in clock status bits to determine performance of each clock source or crystal. It should be noted that the underlying concept of the exemplary embodiment(s) of the present invention would not change if one or more blocks (or devices) were added to or removed from diagram 200.

Multiplexer 106, in one embodiment, includes an OR-gate 202, two AND-gates 204-206, and an inverter 208. Depending on logic value of the select signal from selector 108 via connection 130, multiplexer 106 is configured to select either primary clock 102 or secondary clock 104 as system clock 116. The selected clock signal is subsequently forwarded to a buffer 240 which will distribute clock signals to various circuits and/or components for digital data processing.

Clock monitoring component 110 includes a one-shot circuit 210 which is able to monitor system clock 116 or system clock signals via connection 132. A clock failover signal indicating failure of system clock 116 is broadcasted over connection 134 upon detecting the system clock failure. To sense defective system clock, one-shot circuit 210 receives signals from system clock 116 via connection 132 and fires a clock failover signal as soon as it stops receiving triggers over connection 132. Depending on applications, one-shot circuit outputs a positive value and a negative value wherein the positive value feeds into system reset component 112 while the negative value 226 feeds to selector 108.

In one aspect, one-shot circuit 210 instructs selector 108 via connection 134 to maintain the selection of source clock as long as normal clock cycles of system clock 116 are detected. If clock cycles provided by system clock 116 are absent or failed, one-shot circuit 210 informs selector 108 that a clock source switchover should be initiated. A one-shot circuit 210, which could have similar circuitry layout as SN74121, is able to generate an output pulse having a predefined pulse triggered by the event of missing clock cycles of system clock 116. When system clock operates normally, each rising edge of clock cycle retriggers one-shot circuit 210 whereby one-shot circuit 210 maintains its output at a constant logic level such as logic state high.

The output of one-shot circuit is kept at a constant logic level (i.e., logic high) because system clock 116 keeps triggering the one-shot circuit every rising edge of clock cycle. If the output of one-shot circuit maintains at an active level, for example, selector 108 keeps the clock source selection whereby no clock source switchover occurs. If, however, system clock 116 fails and stops retriggering one-shot circuit 210, one-shot circuit 210 changes its output to a different logic state which will trigger selector 108 to switch from a previously selected clock source to a backup clock source. When one-shot circuit 210 sends a clock failover signal to selector 108, selector 108 issues a select signal which will cause multiplexer 106 to switch from, for example, primary clock source 102 to secondary clock 104.

System reset component 112, in one embodiment, includes a power supervisor 212, OR-gate 230, and AND-gate 228. To recover from potential glitches or spikes during a clock switchover, power supervisor 212 is used to generate a system reset allowing the secondary clock cycles to stabilize. In one embodiment, power supervisor 212 generates a clean reset by providing a pulse which causes sufficient delay for stabilizing new clock cycles. Depending on applications, the delay can be set in a range from 50 ms to 500 ms. When system reset signal over a connection 136 becomes inactive after proper delay, the secondary clock should be sufficiently stable whereby it is subsequently used as system clock 116. When system recovers after resumption of system clock, the processor or diagnostic unit within the system begins to evaluate (or interrogate) reasons for clock failure.

Selector 108 includes a D flip-flop 220 and AND-gate 222 wherein D flip-flop 220 functions as a toggle switch capable of switching between primary clock 102 and secondary clock 104. D flip-flop 220 changes its value when it detects a rising edge of a signal at its clock terminal which is fed by the output of AND-gate 222. The output of AND-gate 222 changes its logic state when its input terminals receive active logic states. For example, when the clock failover signal is active and system reset signal is inactive, the output of AND-gate 222 produces an active logic state. A change from an inactive state to an active state generates a rising edge which will trigger D flip-flop to change its content. The content of D flip-flop determines which clock source to use. For example, D flip-flop selects primary clock 102 as a system clock when its content is logic zero (0) state. D flip-flop selects secondary clock 104 as a system clock when its content is logic one (1) state. It should be noted that other types of flip-flop circuits such as JK flip-flop or RS flip-flop may be used in place of D flip-flop 220.

Referring back to FIG. 2, a clock management device capable of implementing system clock failover includes a clock monitoring component 110, system reset circuit 112, selector 108, and a switch 106. While clock monitoring component 110 is able to detect a clock failure in accordance with system clock signals, system reset circuit 112 is configured to generate a system reset signal for a predefined period of time to stabilize signals generated by an alternative clock source. Clock monitoring component 110 includes a one-shot circuit 210 capable of generating a switching signal upon detecting a clock failure. System reset circuit 112 is a power supervisor circuitry configured to provide a delayed system reset signal to recover from any clock glitches.

After selector 108 selects an alternative clock source such as secondary clock 104 for system clock generation, switch 106 resumes system clock signals using secondary clock source 104 in response to the system reset signal and switching signal. Selector 108 includes a D flip-flop 220 configured to generate a clock selection signal indicating either primary clock component 102 or secondary clock component 104 should be selected to generate system clock signals in response to the clock failure. Switch 106, for example, is multiplexer configured to select clock signals from primary clock component 102 or secondary clock component 104 for generating system clock signals in accordance with the clock selection signal.

In one embodiment, the clock management device further includes a primary clock component and a secondary clock component capable of running clock signals independently whereby one clock component can take over clock distribution task quickly. Memory bits 120-122 stores status relating to clock component 102-104. It should be noted that the clock management device can include additional clock sources and other functional components to facilitate smooth switchover between clock crystals.

An advantage of using embodiment(s) of the present invention is to provide system clock failover with simple and inexpensive circuit layout that can be applied or installed at various digital processing devices such as packet routers to enhance device reliability.

Figure 3:
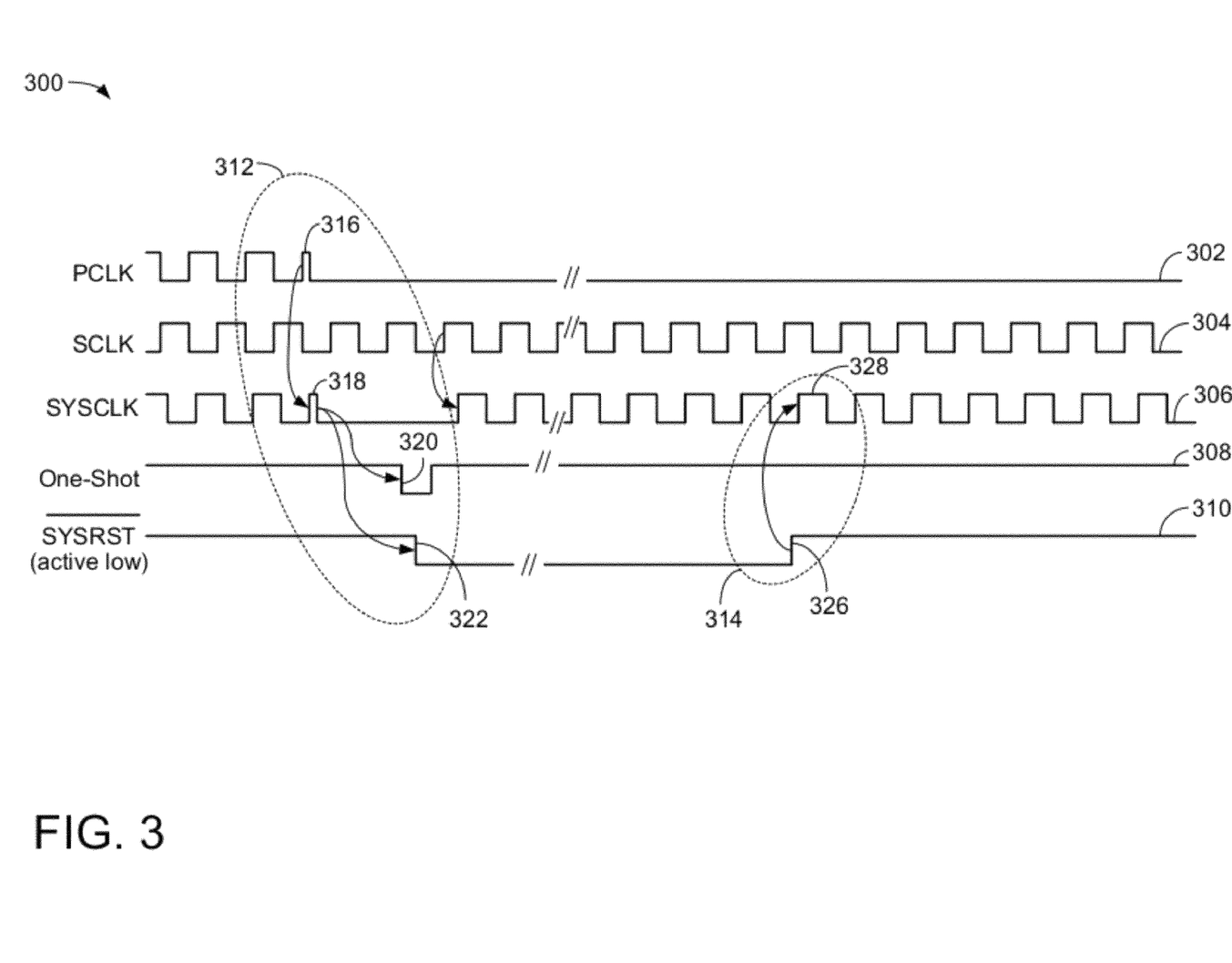
FIG. 3 is a timing diagram illustrating various timing durations of clock signals for system clock failover operation in accordance with one embodiment of the present invention.

FIG. 3 is a timing diagram 300 illustrating various timing durations of clock signals for system clock failover operation in accordance with one embodiment of the present invention. Diagram 300 illustrates a primary clock signal 302 ("PCLK"), a secondary clock signal 304 ("SCLK"), a system clock signal 306 ("SYSCLK"), a one-shot signal 308, and a system reset signal 310 ("SYSRST"). When PCLK fails at cycle 316, SYSCLK subsequently fails at cycle 318 assuming SYSCLK is provided by PCLK. When SYSCLK fails at cycle 318, SYSCLK failure triggers one-shot signal to change at cycle 320 and SYSRST signal to change at cycle 322. After sufficient delay of SYSRST, rising edge 326 of SYSRST ensures SYSCLK is stable and the system recovers. It should be noted that areas 312-314 may vary depending on applications and circuits used.

Figure 4:
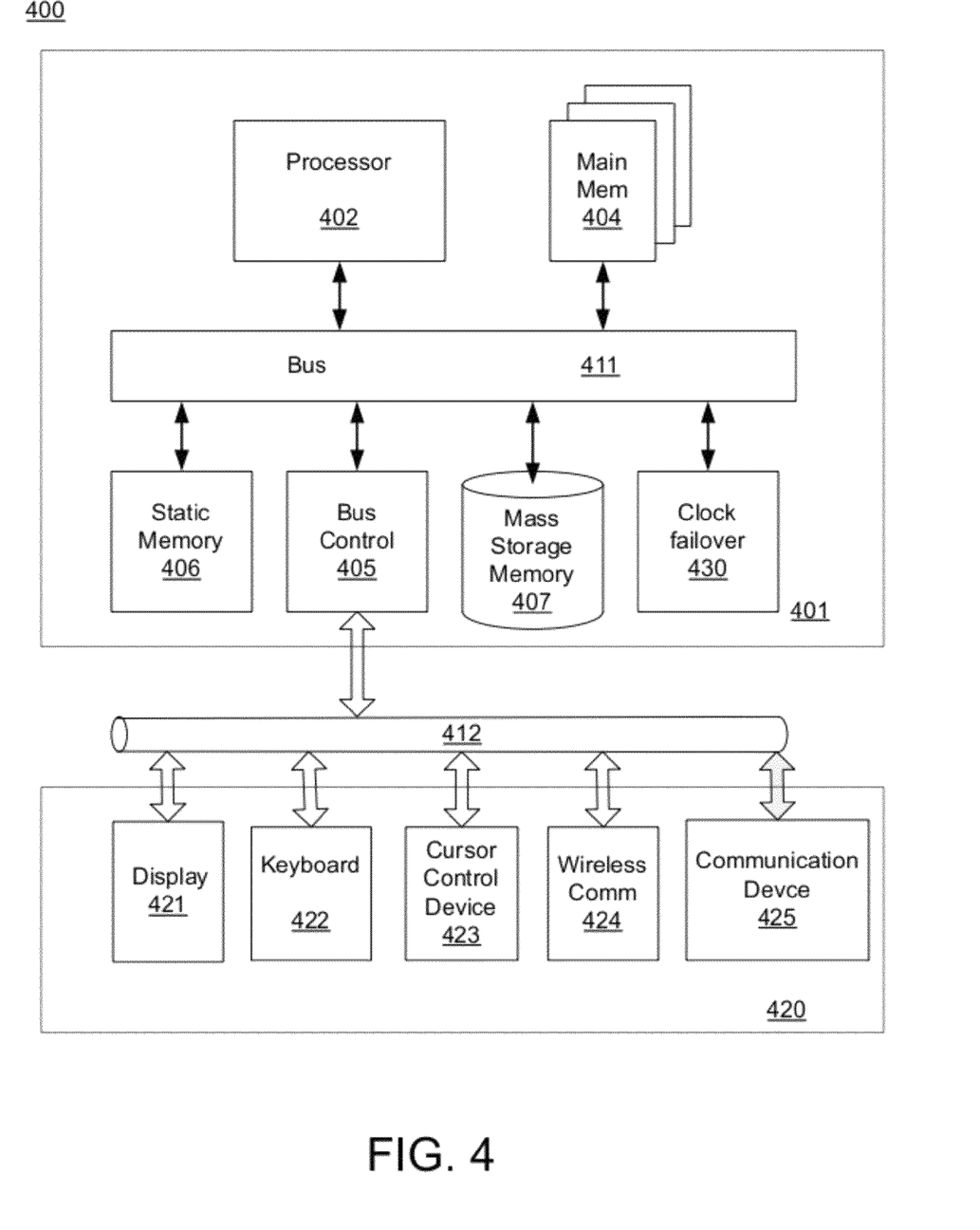
FIG. 4 is a block diagram illustrating a digital processing device capable of implementing system clock failover in accordance with one embodiment of the present invention.

FIG. 4 is a block diagram illustrating a digital processing device capable of implementing system clock failover in accordance with one embodiment of the present invention. Having briefly described system clock failover in which the exemplary embodiment of present invention operates, FIG. 4 illustrates a digital processing system 400 capable of implementing system clock failover in which the features of the present embodiment may be implemented. It will be apparent to those of ordinary skills in the art that other alternative computer system architectures may also be employed.

Computer system 400 includes a processing unit 401, an interface bus 412, and an input/output ("IO") unit 420. Processing unit 401 includes a processor 402, a main memory 404, a system bus 411, a static memory device 406, a bus control unit 405, and a mass storage memory 407. Bus 411 is used to transmit information between various components and processor 402 for data processing. Processor 402 may be any of a wide variety of general-purpose processors, embedded processors, or microprocessors such as ARM® embedded processors, Intel® Core™2 Duo, Core™2 Quad, Xeon®, Pentium™ microprocessor, Motorola™ 68040, AMD® family processors, or Power PC™ microprocessor.

Main memory 404, which may include multiple levels of cache memories, stores frequently used data and instructions. Main memory 404 may be RAM (random access memory), MRAM (magnetic RAM), or flash memory. Static memory 406 may be a ROM (read-only memory), which is coupled to bus 411, for storing static information and/or instructions. Bus control unit 405 is coupled to buses 411-412 and controls which component, such as main memory 404 or processor 402, can use the bus. Mass storage memory 407 may be a magnetic disk, an optical disk, hard disk drive, external storage, CD-ROM, and/or flash memories for storing large amounts of data.

I/O unit 420, in one embodiment, includes a display 421, keyboard 422, cursor control device 423, web browser 424, and communication device 425. Display device 421 may be a liquid crystal device, cathode ray tube ("CRT"), touch-screen display, or other suitable display device. Display 421 projects or displays graphical images or windows. Keyboard 422 can be a conventional alphanumeric input device for communicating information between computer system 400 and computer operator(s). Another type of user input device is cursor control device 423, such as a mouse, touch mouse, trackball, or other type of cursor for communicating information between system 400 and user(s).

Communication device 425 is coupled to bus 412 for accessing information from remote computers or servers through wide-area network including wireless communications network. Communication device 425 may include a modem, a router, or a network interface device, or other similar devices that facilitate communication between computer 400 and the network.

Processing unit 401 further includes a clock failover device 430, wherein a function of system clock failover is to change clock signal from one clock source to another clock source without significantly affecting clock domains or system performance. In one embodiment, when a primary clock fails and failover occurs, a secondary, spare, or backup clock source assumes clock distributions and tasks formerly handled by the primary clock. It should be noted that digital processing system 400 can be used in a computing machine, network router, local switches or hubs, wireless routers, and so forth.

Figure 5:
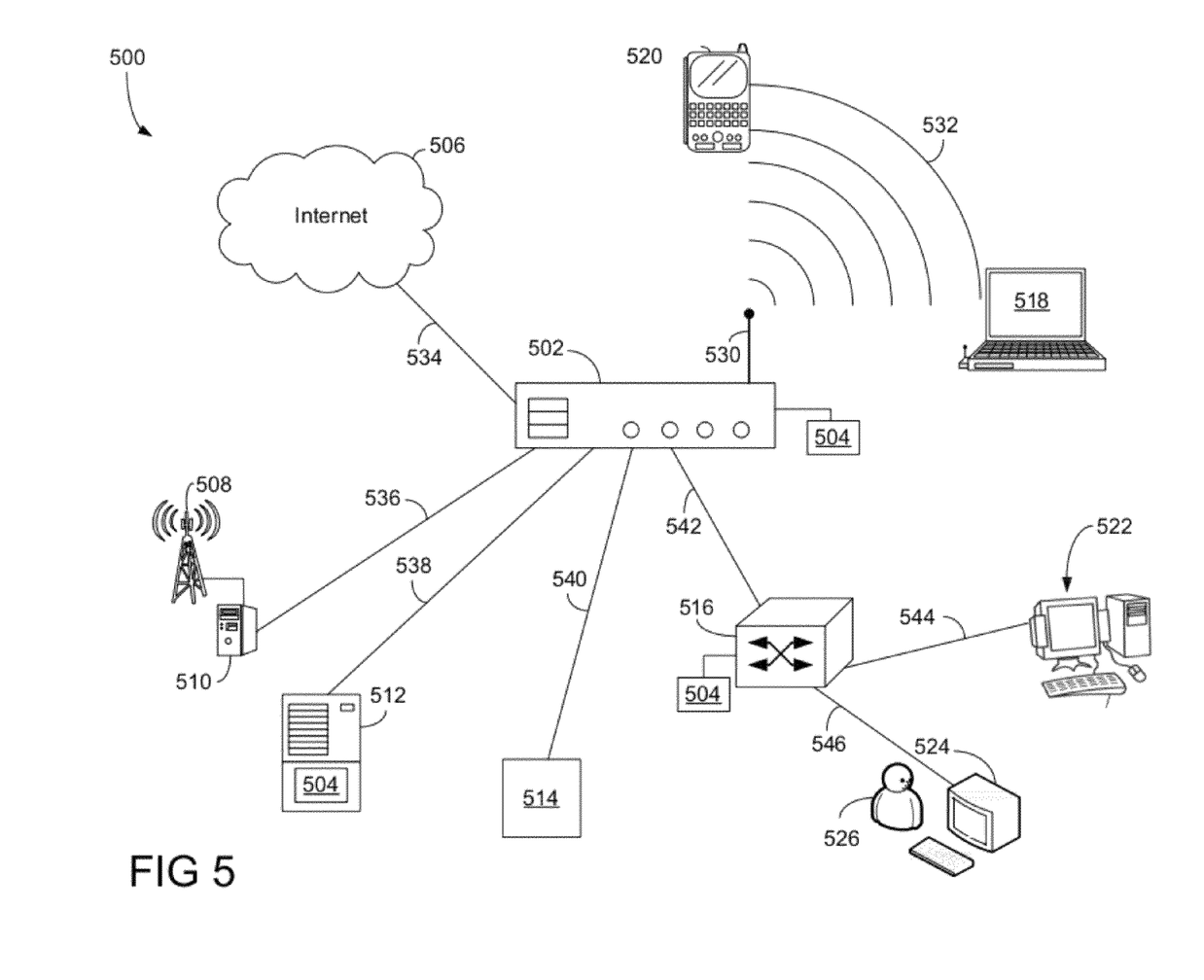
FIG. 5 is a block diagram illustrating a communications network having various network devices capable of implementing clock failover in accordance with one embodiment of the present invention.

FIG. 5 is a block diagram illustrating a communications network 500 having various network devices capable of implementing clock failover in accordance with one embodiment of the present invention. Diagram 500 includes an access device 502, Node B 508, online storage server 512, router 516, Internet 506, and wireless devices 518-520. Access device 502, in one example, can be a network switch, simple router, wireless gateway, hub, bridge, or the like. In one embodiment, access device 502 includes a system clock failover component 504 capable of switching from a primary clock to a secondary clock for the system cycle upon detecting a failure of primary clock. It should be noted that the underlying concept of the exemplary embodiment(s) of the present invention would not change if one or more devices were added to or removed from diagram 500.

Access device 502 is coupled to Internet 506, Node B 508, online storage server 512, router 516, portable device 520, computer 518, modem 514 via wired and/or wireless connections 532-542 for packets switching and/or forwarding. Router 516 is further coupled with server 522 and an administrator 526 via connections 544-546. In one aspect, online storage server 512 and router 516 include system clock failover components 504 capable of switching between a primary clock and a secondary clock to enhance device reliability. It should be noted that device 504 can be used by other digital processing devices, such as Node B, computer 518, server 522, modem 514, et cetera.

The exemplary embodiment of the present invention includes various processing steps, which will be described below. The steps of the embodiment may be embodied in machine or computer executable instructions. The instructions can be used to program a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 6:
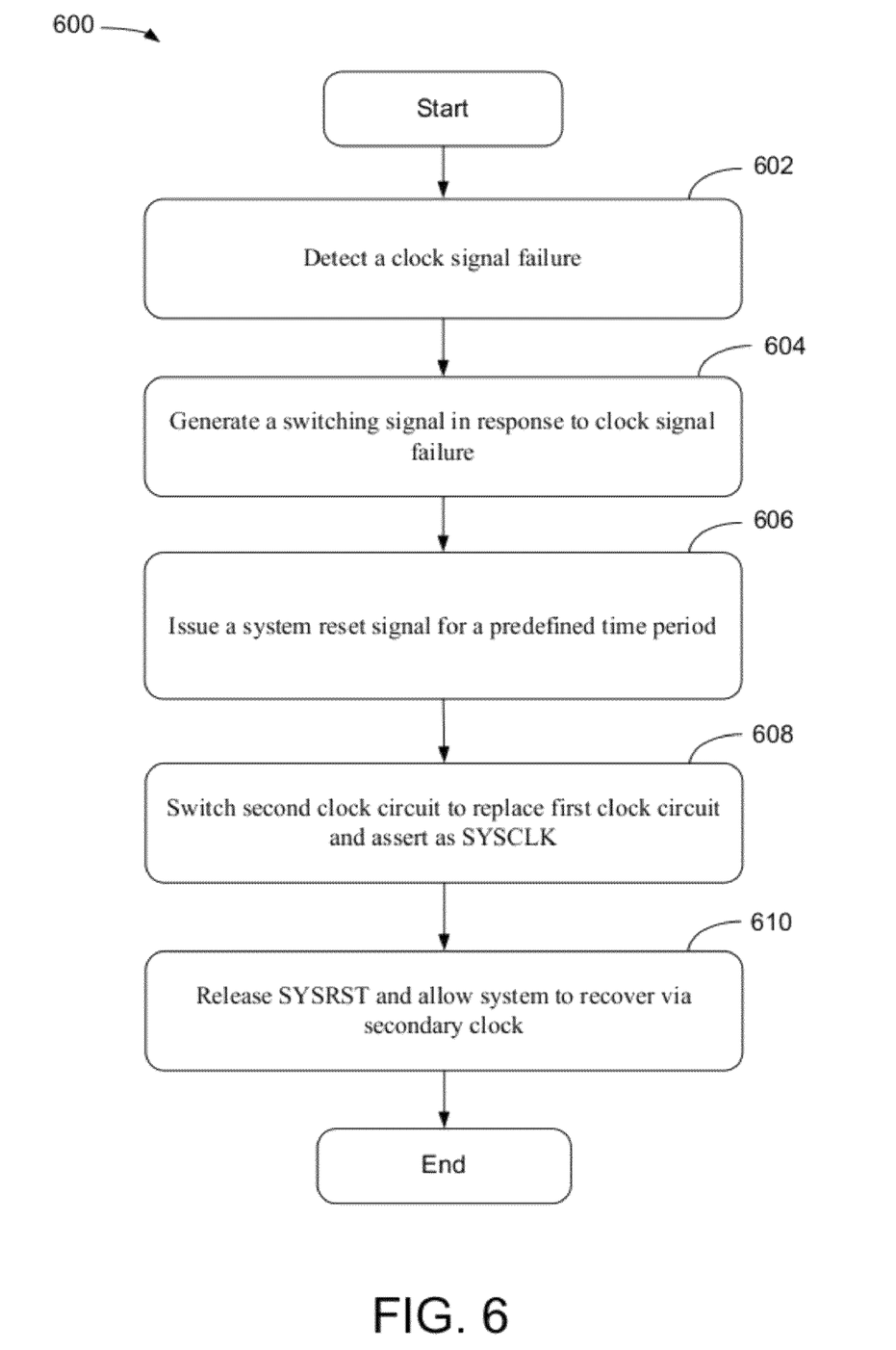
FIG. 6 is a flowchart illustrating a process of performing system clock failover in accordance with one embodiment of the present invention.

FIG. 6 is a flowchart 600 illustrating a process of performing system clock failover in accordance with one embodiment of the present invention. At block 602, a process detects a clock failure wherein clock signals are generated by a first clock circuit. Upon feeding a system clock to a one-shot circuit, the process is able to generate a clock failover signal by the one-shot circuit in accordance with the clock signals from the system clock. In one aspect, a system clock is monitored through its clock signals generated by a primary clock crystal.

At block 604, a switching signal is generated in response to the clock failure. The process, for example, is capable of generating a clock failover signal from a one-shot circuit in response to the detection of a system clock failure.

At block 606, a system reset signal is asserted for a predefined time period in accordance with the clock failure. Upon activating the system reset signal in response to the clock failure, the process is configured to wait for the predefined period of time allowing signals from the second clock circuit to stabilize. Once the second clock circuit is stabilized, the system reset signal is deactivated. In one embodiment, the process sets a delay counter to a value which has a range from 10 ms to 300 ms.

At block 608, a second clock circuit is switched to replace the first clock circuit in response to the switching signal. In one embodiment, the process logically removes a primary clock crystal from the system clock and uses the second clock crystal to generate system clock.

At block 610, the process releases SYSRST and allows the system to recover via the second clock circuit. In one embodiment, the process is capable of updating a first clock status bit indicating status of the first clock circuit and updating a second clock status bit indicating status of the second clock circuit.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for clock management, comprising:
   detecting a clock failure wherein a plurality of clock signals are generated by a first clock circuit;
   generating a clock failover signal in response to said clock failure;
   asserting a system reset signal for a predefined time period in accordance with said clock failure;
   replacing said first clock circuit with a second clock circuit for clock generation in response to said switching signal; and
   resuming said clock signals in accordance with said second clock circuit.

2. The method of claim 1, further comprising,
   updating a first clock status bit indicating status of said first clock circuit; and
   updating a second clock status bit indicating status of said second clock circuit.

3. The method of claim 1, wherein detecting a clock failure includes:
   routing a system clock to a one-shot circuit as an input signal; and
   generating a clock failover signal by said one-shot circuit in accordance with said clock signals from said system clock.

4. The method of claim 1, wherein detecting a clock failure further includes monitoring a system clock via said plurality of clock signals generated by a primary clock crystal.

5. The method of claim 1, wherein generating a switching signal in response to said clock failure further includes generating a clock failover signal from a one-shot circuit in response to detection of a system clock failure.

6. The method of claim 1, wherein asserting a system reset signal for a predefined time period:
   activating said system reset signal in response to said clock failure;

holding said system reset signal to an active logic state for said predefined period of time allowing signals from said second clock circuit to stabilize; and deactivating said system reset signal.

7. The method of claim 6, wherein holding said system reset signal to active logic state includes increasing value of a delay counter wherein said value has a range from 10 milliseconds to 300 milliseconds.

8. The method of claim 1, wherein replacing said first clock circuit with a second clock circuit for clock generation further includes logically removing a primary clock crystal from a system clock and coupling a second clock crystal to a system clock.

9. The method of claim 8, wherein coupling a second clock crystal to a system clock includes selecting signals from said second clock crystal as said system clock.

10. A clock device, comprising:
a clock monitoring component operable to detect a clock failure in accordance with system clock cycles generated by a system clock;
a system reset circuit coupled to said clock monitor component and configured to activation of a system reset signal for a predefined period of time to stabilize signals generated by an alternative clock source;
a selector coupled to said system reset circuit and operable to select said alternative clock source to generate said system clock cycles; and
a switch coupled to said selector and configured to resume said system clock signals utilizing said secondary clock source in response to said switching signal.

11. The device of claim 10, further includes a primary clock component and a secondary clock component, coupled to said switch, operable to independently provide clock signals.

12. The device of claim 11, further includes a plurality of memory bits, coupled to said primary clock component and said secondary clock component, configured to store status relating to said primary clock component and said secondary clock component.

13. The device of claim 10, wherein said clock monitoring component includes a one-shot circuit capable of generating a clock failover signal upon detecting said clock failure.

14. The device of claim 13, wherein said system reset circuit includes a power supervisor circuitry configured to provide a system reset signal of a predefined duration to reduce glitches.

15. The device of claim 14, wherein said selector includes a D flip-flop configured to generate a select signal indicating one of said primary clock component and said secondary clock component is selected to generate system clock cycles.

16. The device of claim 15, wherein said switch includes a multiplexer configured to select one of said primary clock component and said secondary clock component for said system clock.

17. An apparatus for clock management, comprising:
means for detecting a clock failure wherein a plurality of clock signals are generated by a first clock circuit;
means for generating a clock failover signal in response to said clock failure;
means for asserting a system reset signal for a predefined time period in accordance with said clock failure;
means for replacing said first clock circuit with a second clock circuit for clock generation in response to said switching signal; and
means for resuming said clock signals in accordance with said second clock circuit.

18. The apparatus of claim 17, further comprising,
means for updating a first clock status bit to indicate status of said first clock circuit; and
means for updating a second clock status bit to indicate status of said second clock circuit.

19. The apparatus of claim 17, wherein means for detecting a clock failure includes:
means for routing a system clock to a one-shot circuit as an input signal; and
means for generating a clock failover signal by said one-shot circuit in accordance with said clock signals from said system clock.

20. The apparatus of claim 17, wherein means for detecting a clock failure further includes means for monitoring a system clock via said plurality of clock signals generated by a primary clock crystal.

* * * * *